(12) United States Patent
Rammer et al.

(10) Patent No.: US 8,931,456 B2
(45) Date of Patent: Jan. 13, 2015

(54) METHOD AND DEVICE FOR ENGINE BRAKING

(75) Inventors: Franz Rammer, Wolfern (AT); Franz Leitenmayr, Perg (AT); Gottfried Raab, Perg (AT)

(73) Assignee: Man Nutzfahrzeuge Oesterreich AG, Steyr (AT)

( * ) Notice: Subject to any disclaimer, the term of this patent is extended or adjusted under 35 U.S.C. 154(b) by 598 days.

(21) Appl. No.: 13/190,544

(22) Filed: Jul. 26, 2011

(65) Prior Publication Data
US 2012/0017869 A1    Jan. 26, 2012

(30) Foreign Application Priority Data
Jul. 26, 2010  (AT) .................................. 1245/2010

(51) Int. Cl.
*F02D 9/06* (2006.01)
*F01L 1/18* (2006.01)
(Continued)

(52) U.S. Cl.
CPC . *F02D 9/06* (2013.01); *F01L 1/181* (2013.01); *F01L 13/06* (2013.01); *F02B 37/025* (2013.01); *F02B 37/18* (2013.01); *F02B 37/22* (2013.01); *F02D 13/04* (2013.01); *F02D 41/0007* (2013.01); *F02D 41/0055* (2013.01); *F02D 41/1448* (2013.01); *F02D 2200/0406* (2013.01); *F02D 2250/34* (2013.01); *Y02T 10/144* (2013.01); *Y02T 10/47* (2013.01)
USPC .............................. 123/323; 123/321; 60/602

(58) Field of Classification Search
CPC ............... F02D 9/06; F02D 9/08; F02D 9/10; F02D 41/0005; F02D 41/0007; F02D 41/144; F02D 41/1441; F02D 41/1448; G05D 16/2013
USPC .......... 123/321–323, 559.1, 559.2, 562, 564, 123/568.11; 60/602, 605.2; 188/273
See application file for complete search history.

(56) References Cited

U.S. PATENT DOCUMENTS

| 4,008,572 A | * | 2/1977 | Woollenweber, Jr. | .......... 60/602 |
| 4,138,849 A | * | 2/1979 | Wilber | ............................ 60/602 |

(Continued)

FOREIGN PATENT DOCUMENTS

| EP | 0736672 B1 | 4/1998 |
| EP | 1762716 A1 | * 3/2007 |

(Continued)

*Primary Examiner* — Mahmoud Gimie
*Assistant Examiner* — John Zaleskas
(74) *Attorney, Agent, or Firm* — Laurence A. Greenberg; Werner H. Stemer; Ralph E. Locher

(57) ABSTRACT

A method for engine braking of an engine which has at least one exhaust-gas turbocharger with an exhaust-gas turbine acted on by an exhaust-gas flow and a charge air compressor. A device for throttling exhaust-gas flow is arranged between exhaust outlet valves and the exhaust-gas turbocharger, and a bypass line conducts the exhaust-gas flow past the throttling device, the exhaust-gas flow being conducted through the at least one bypass line to a turbine wheel of the exhaust-gas turbine. An exhaust gas counter-pressure and a charge air pressure are measured. Based on the measurement, an optimum position of the throttling device to obtain a predetermined braking action is determined. The exhaust-gas counter-pressure and the charge air pressure are subsequently controlled by adjusting the throttling device corresponding to the determination of the optimum position of the throttling device.

25 Claims, 8 Drawing Sheets

(51) Int. Cl.
*F01L 13/06* (2006.01)
*F02B 37/02* (2006.01)
*F02B 37/18* (2006.01)
*F02B 37/22* (2006.01)
*F02D 13/04* (2006.01)
*F02D 41/00* (2006.01)
*F02D 41/14* (2006.01)

(56) References Cited

U.S. PATENT DOCUMENTS

| | | | |
|---|---|---|---|
| 4,169,354 A * | 10/1979 | Woollenweber | 60/600 |
| 4,526,004 A * | 7/1985 | French et al. | 60/602 |
| 4,794,758 A * | 1/1989 | Nakazawa et al. | 60/602 |
| 5,372,109 A * | 12/1994 | Thompson et al. | 123/323 |
| 5,638,926 A * | 6/1997 | McCrickard | 188/273 |
| 5,692,469 A | 12/1997 | Rammer et al. | |
| 5,839,281 A * | 11/1998 | Sumser et al. | 60/602 |
| 5,850,737 A * | 12/1998 | Aschner et al. | 60/602 |
| 5,943,864 A * | 8/1999 | Sumser et al. | 60/602 |
| 6,085,526 A * | 7/2000 | Bischoff | 60/602 |
| 6,101,812 A * | 8/2000 | Schmidt et al. | 60/602 |
| 6,109,027 A * | 8/2000 | Schaefer | 60/324 |
| 6,155,049 A * | 12/2000 | Bischoff | 60/602 |
| 6,161,384 A * | 12/2000 | Reinbold et al. | 60/602 |
| 6,179,096 B1 * | 1/2001 | Kinerson et al. | 188/154 |
| 6,216,459 B1 * | 4/2001 | Daudel et al. | 60/605.2 |
| 6,543,226 B1 * | 4/2003 | Bischoff et al. | 60/602 |
| 6,694,735 B2 * | 2/2004 | Sumser et al. | 60/605.2 |
| 6,945,240 B2 * | 9/2005 | Kobayashi et al. | 123/568.21 |
| 7,275,367 B2 * | 10/2007 | Tamura et al. | 60/324 |
| 7,434,398 B2 * | 10/2008 | Olsson et al. | 60/602 |
| 7,523,736 B2 | 4/2009 | Rammer et al. | |
| 7,637,106 B2 * | 12/2009 | Hertweck et al. | 60/602 |
| 7,765,981 B2 * | 8/2010 | Lhote et al. | 123/323 |
| 7,934,379 B2 * | 5/2011 | Kuspert et al. | 60/602 |
| 8,011,347 B2 * | 9/2011 | Lhote et al. | 123/323 |
| 2002/0092300 A1 * | 7/2002 | Schmidt et al. | 60/602 |
| 2003/0019470 A1 * | 1/2003 | Anderson et al. | 123/323 |
| 2005/0087170 A1 * | 4/2005 | Rammer et al. | 123/321 |
| 2006/0201151 A1 * | 9/2006 | Olsson et al. | 60/602 |
| 2009/0173313 A1 * | 7/2009 | Bohme et al. | 123/323 |
| 2012/0017868 A1 * | 1/2012 | Rammer et al. | 123/323 |

FOREIGN PATENT DOCUMENTS

| | | |
|---|---|---|
| EP | 1801392 A2 | 6/2007 |
| WO | WO 2007129970 A1 * | 11/2007 |

* cited by examiner

METHOD AND DEVICE FOR ENGINE BRAKING

CROSS-REFERENCE TO RELATED APPLICATION

This application claims the priority, under 35 U.S.C. §119, of Austrian patent application A 1245/2010, filed Jul. 26, 2010; the prior application is herewith incorporated by reference in its entirety.

BACKGROUND OF THE INVENTION

Field of the Invention

The present invention relates to a method and a device for engine braking of an engine, preferably a diesel engine. The engine has at least one exhaust-gas turbocharger having an exhaust-gas turbine acted on by an exhaust-gas flow and having a charge air compressor, which exhaust-gas turbine and charge air compressor are arranged on a common shaft. An exhaust manifold conducts the exhaust-gas flow from outlet valves of the engine to the exhaust-gas turbocharger. A device is provided for throttling the exhaust-gas flow between the outlet valves and the exhaust-gas turbocharger. A bypass line conducts the exhaust-gas flow past the device for throttling the exhaust-gas flow, the exhaust-gas flow being conducted through the bypass line to a turbine wheel of the exhaust-gas turbine, the exhaust-gas flow being throttled and a pressure increase in the exhaust gas thus being generated upstream of the device for throttling the exhaust-gas flow. Here, the term "upstream" is to be understood to mean a flow direction of the exhaust gas opposite to the flow direction of the exhaust gas when the latter leaves the engine via the outlet valves thereof and flows in the direction of the throttle device or exhaust-gas turbocharger.

An engine braking device and an engine braking method of interest in this context is described, for example, in commonly assigned U.S. Pat. No. 5,692,469 and its counterpart European patent EP 0736672 B1. There, engine braking is carried out by virtue of the exhaust-gas flow being throttled and a pressure increase in the exhaust gas thus being generated upstream of the throttle device, which exhaust gas flows back into the combustion chamber after an intermediate opening of the outlet valve and serves to provide the engine braking action during the subsequent compression stroke with the outlet valve still held partially open. Here, during engine braking, an intermediate opening of the outlet valve effected by the pressure increase generated in the exhaust gas when in the throttling position is subjected to a control-based intervention by virtue of the outlet valve, which tends toward closing after the intermediate opening, being forcibly prevented from closing, and then being held partially open at the latest until the cam-controlled outlet valve opening, by the interception of a control unit installed remote from the camshaft in the outlet valve actuating mechanism.

In that engine braking method, during the engine braking mode, the throttle flaps arranged in the exhaust-gas tract are situated in a throttling position in which the associated exhaust-gas tract is not fully closed, such that a part of the built-up exhaust gas can pass the throttle flap through a narrow gap which remains open at the edge. The exhaust-gas slippage is necessary to prevent a stall of the exhaust-gas flow and an overheating of the internal combustion engine or engine.

Even though the known engine braking method provides excellent braking action, there is in some applications a desire for an increase in the braking action during the engine braking mode in order that the other braking systems in the vehicle, such as a retarder and service brake, can be relieved of load to a greater extent or dimensioned to be smaller. For this purpose, additional measures are necessary to make it possible to raise the charge air pressure during the engine braking mode such that considerably higher exhaust-gas counter-pressures are set.

Various devices and methods are already known for obtaining such a charge air pressure increase for an increase in braking action. European published patent application EP 1 762 716 A1, for example, describes an arrangement for controlling the exhaust-gas flow of an engine, a bypass line being arranged between the outlet valves and the turbocharger, which bypass line conducts a part of the exhaust-gas flow past the throttle device and conducts the part of the exhaust-gas flow to the turbine wheel of the turbocharger. It is therefore possible to provide an adequate air quantity for acting on the engine when the turbocharger, even with the braking flap closed, attains a high rotational speed and therefore a corresponding delivery volume.

Our earlier, commonly assigned U.S. Pat. No. 7,523,736 B2 and its counterpart European patent application EP 1 801 392 describe a device for increasing the braking action of a multi-cylinder internal combustion engine of a vehicle during the engine braking mode, wherein each exhaust-gas collecting tract can be fully shut off by means of a shut-off flap during the engine braking mode, a bypass line branches off from that region of each exhaust-gas collecting tract which can be shut off, each bypass line communicates with a nozzle bore formed in a turbine wall of the exhaust-gas turbine, the two nozzle bores open out into the turbine chamber, in a plane perpendicular to the axis of the turbine wheel, either running parallel to one another and via in each case one outlet adjacent to the other, or running at an acute angle relative to one another and merging into one another and then via a common outlet, so as to be directed tangentially toward the outer region of the turbine wheel.

The devices and methods mentioned above control the engine braking action by means of the exhaust-gas counter-pressure, which depending on the flap position of the throttle device can lead to a less favorable response behavior of the brake system, and have complex switching valves for nozzle shut-off.

SUMMARY OF THE INVENTION

It is accordingly an object of the invention to provide an engine braking method which overcomes the above-mentioned disadvantages of the heretofore-known devices and methods of this general type and which provides for method and a device for engine braking which, with relatively low component and cost outlay and improved regulation, provide an increased engine braking action.

With the foregoing and other objects in view there is provided, in accordance with the invention, a method for engine braking of an engine. The engine, which is preferably diesel engine, has at least one exhaust-gas turbocharger with an exhaust-gas turbine acted on by an exhaust-gas flow and a charge air compressor, the exhaust-gas turbine and the charge air compressor being commonly mounted on a common shaft; an exhaust gas manifold disposed to conduct an exhaust-gas flow from outlet valves of the engine to the exhaust-gas turbocharger; a throttling device for throttling the exhaust-gas flow between the outlet valves and the at least one exhaust-gas turbocharger; and at least one bypass line for conducting the exhaust-gas flow past the throttling device.

The novel method comprises the following method steps:

conducting the exhaust-gas flow through the at least one bypass line to a turbine wheel of the exhaust-gas turbine, throttling the exhaust-gas flow and thus generating a pressure increase in the exhaust gas upstream of the throttling device for throttling the exhaust-gas flow, and taking a measurement of an exhaust-gas counter-pressure and of a charge air pressure;

determining, based on the measurement of the exhaust-gas counter-pressure and of the charge air pressure, a position of the throttling device to obtain a predetermined braking action; and controlling the exhaust-gas counter-pressure and the charge air pressure by way of the throttling device in accordance with the determined position of the throttling device for throttling the exhaust-gas flow.

In other words, the objects of the invention are achieved by a method for engine braking of a multi-cylinder engine operating preferably on the diesel principle is provided. Here, the engine has at least one exhaust-gas turbocharger having an exhaust-gas turbine acted on by an exhaust-gas flow and having a charge air compressor, which exhaust-gas turbine and charge air compressor are arranged on a common shaft. If a multiplicity of exhaust-gas turbochargers are provided, it is preferable for at least one high-pressure stage and one low-pressure stage to be provided. The engine also has at least one exhaust manifold which conducts the exhaust-gas flow from outlet valves of the engine to the exhaust-gas turbocharger, and has at least one device for throttling the exhaust-gas flow arranged between the outlet valves and the exhaust-gas turbocharger, and also has at least one bypass line for conducting the exhaust-gas flow past the device for throttling the exhaust-gas flow, the exhaust-gas flow being conducted through the at least one bypass line to at least one turbine wheel of the exhaust-gas turbine, the exhaust-gas flow being throttled and a pressure increase in the exhaust gas thus being generated upstream of the device for throttling the exhaust-gas flow.

The terms regulate and regulation as used herein are synonymous with closed-loop control and parameter-driven control.

According to the method, a measurement of an exhaust-gas counter-pressure and of a charge air pressure also take place. On the basis of the measurement of the exhaust-gas counter-pressure and of the charge air pressure, a determination of an optimum position of the device for throttling the exhaust-gas flow to obtain a predetermined braking action can be carried out. In other words, a position of the device for throttling the exhaust-gas flow for obtaining a predetermined position can be determined.

Closed-loop control of the exhaust-gas counter-pressure and of the charge air pressure is subsequently carried out by adjusting the device for throttling the exhaust-gas flow corresponding to the determination of the optimum position of the device for throttling the exhaust-gas flow or corresponding to the determined position of the device for throttling the exhaust-gas flow.

This, in contrast with closed-loop control only on the basis of the exhaust-gas counter-pressure as a control variable, makes it possible to attain a higher exhaust-gas counter-pressure over the entire rotational speed range of the engine. The charge air pressure generated by the exhaust-gas turbocharger has a significant influence on the exhaust-gas counter-pressure. The incorporation of the charge air pressure into the regulation of the exhaust-gas counter-pressure therefore permits a faster increase of the exhaust-gas counter-pressure and therefore an improved engine braking action.

The optimum position of the device for throttling the exhaust-gas flow in a first rotational speed range of the engine is preferably a closed position in which the cross section of an exhaust system is blocked and the exhaust-gas flow is conducted through the at least one bypass line past the device for throttling the exhaust-gas flow. Alternatively, the optimum position of the device for throttling the exhaust-gas flow in a first rotational speed range of the engine may likewise be a closed position in which at least a part of the cross section of the exhaust system is opened up and at least a part of the exhaust-gas flow is conducted through the at least one bypass line past the device for throttling the exhaust-gas flow.

According to a further aspect of the present invention, the optimum position of the device for throttling the exhaust-gas flow in a second rotational speed range of the engine is a closed position in which at least a part of the cross section of the exhaust system is opened up and a part of the exhaust-gas flow is conducted through the at least one bypass line past the device for throttling the exhaust-gas flow.

The bypass line has a smaller cross section than the exhaust system, such that a predeterminedly limited exhaust-gas flow is conducted at high speed and therefore with high impetus to the turbine wheel of the exhaust-gas turbine. It is achieved in this way that, despite a relatively low drive air quantity, the exhaust-gas turbocharger is brought up to a relatively high rotational speed and therefore provides the desired air quantity at the compressor side, the device for throttling the exhaust-gas flow preferably being in a closed position in which the cross section of an exhaust system is closed or nearly closed by the device for throttling the exhaust-gas flow and the engine is at a low rotational speed, preferably of lower than 1400 revolutions per minute. It is thereby possible in particular to achieve that the engine brake takes effect even at low rotational speeds. Accordingly, the first rotational speed range of the engine may be a rotational speed range lower than or equal to 1400 revolutions per minute.

In a second rotational speed range of the engine, the optimum position of the device for throttling the exhaust-gas flow is preferably a closed position in which at least a part of the cross section of the exhaust system is opened up and a part of the exhaust-gas flow is conducted through the bypass line past the device for throttling the exhaust-gas flow. Here, the second rotational speed range of the engine is preferably a rotational speed range greater than 1400 revolutions per minute up to a maximum rotational speed of the engine. At a medium and/or high rotational speed of the engine, the exhaust-gas counter-pressure and charge air pressure can therefore be regulated predominantly by means of the device for throttling the exhaust-gas flow.

To obtain a maximum braking action at a respective engine rotational speed, preferably firstly a maximum charge air pressure is set and, after the maximum charge air pressure for the engine rotational speed is reached, regulation of the maximum exhaust-gas counter-pressure is carried out. Depending on the engine rotational speed, therefore, a larger duct cross section of the device for throttling the exhaust-gas flow can be opened up than is possible in conventional regulating methods.

At least one position of the device for throttling the exhaust-gas flow corresponds to a certain exhaust-gas counter-pressure. A detection of a correct position of the device for throttling the exhaust-gas flow is preferably carried out by a regulating unit from a comparison of the present charge air pressure with a setpoint charge air pressure at the present exhaust-gas counter-pressure. The control unit or controller may be for example an engine or vehicle control unit.

With reference to FIG. 4, an improved response behavior in the engine braking mode is therefore obtained. For example, if 90% of the duct area of the device for throttling the exhaust-gas flow is closed off, the exhaust-gas counter-pressure amounts to approximately 65% of the maximum attainable value. If the engine braking action is now to be reduced to zero, the device for throttling the exhaust-gas flow must be opened. However, if the device for throttling the exhaust-gas flow is opened further, there is initially an increase in the exhaust-gas counter-pressure on account of the higher charge air pressure caused by the increased gas throughput. The exhaust-gas counter-pressure therefore initially increases before a decrease can take place, which would result in a poor response behavior of the engine brake. An exhaust-gas counter-pressure of approximately 65% is however likewise present if the duct area of the device for throttling the exhaust-gas flow is closed by only 30%. In the method according to the invention, therefore, a detection of a correct position of the device for throttling the exhaust-gas flow is carried out from a comparison of the present charge air pressure with a setpoint charge air pressure at the present exhaust-gas counter-pressure, as a result of which an improved response behavior is attained in the engine braking mode.

If the present exhaust-gas counter-pressure is lower than a desired exhaust-gas counter-pressure and if the charge air pressure corresponds to a predetermined value, the position of the device for throttling the exhaust-gas flow may be closed further. With reference to FIG. 3, the predetermined value may, for example, be defined as being attained if the charge air pressure percentage is higher than or equal to the exhaust-gas counter-pressure percentage. If the present exhaust-gas counter-pressure is lower than a desired exhaust-gas counter-pressure and if the charge air pressure is lower than a predetermined value, the position of the device for throttling the exhaust-gas flow can be opened further.

In a rotational speed range of the engine from 0 to 1000 revolutions per minute, the device for throttling the exhaust-gas flow is preferably set into a closed position in which both the cross section of the exhaust system and also the at least one bypass line are blocked. Here, the at least one bypass line may be closed by means of a pivoting movement of the device for throttling the exhaust-gas flow.

According to a further aspect, the regulation of the exhaust-gas counter-pressure and of the charge air pressure is carried out, in addition to the regulation by the device for throttling the exhaust-gas flow, by a unit for charge pressure regulation.

According to a further aspect of the present invention, the unit for charge pressure regulation is formed by at least one wastegate which bypasses the exhaust-gas turbine.

With the above and other objects in view there is also provided, in accordance with the invention, a device for engine braking of an engine operating preferably on the diesel principle, which engine has at least one exhaust-gas turbocharger having an exhaust-gas turbine acted on by an exhaust-gas flow and having a charge air compressor, which exhaust-gas turbine and charge air compressor are arranged on a common shaft, having an exhaust manifold which conducts the exhaust-gas flow from outlet valves of the engine to the at least one exhaust-gas turbocharger, and having a device for throttling the exhaust-gas flow arranged between the outlet valves and the exhaust-gas turbocharger, and also having at least one bypass line for conducting the exhaust-gas flow past the device for throttling the exhaust-gas flow, the exhaust-gas flow being conducted through the at least one bypass line to a turbine wheel of the exhaust-gas turbine, the exhaust-gas flow being throttled and a pressure increase in the exhaust gas thus being generated upstream of the device for throttling the exhaust-gas flow, and means being provided for measuring an exhaust-gas counter-pressure and a charge air pressure.

Also provided is a control unit which is suitable for determining, on the basis of the measurement of the exhaust-gas counter-pressure and of the charge air pressure, a position of the device for throttling the exhaust-gas flow to obtain a predetermined braking action. The control unit subsequently carries out regulation of the exhaust-gas counter-pressure and of the charge air pressure by means of the device for throttling the exhaust-gas flow corresponding to the determined position of the device for throttling the exhaust-gas flow.

The device for throttling the exhaust-gas flow preferably has a first closed position in which the cross section of an exhaust system is blocked but the exhaust-gas flow is conducted through the at least one bypass line past the device for throttling the exhaust-gas flow, and a second closed position in which the cross section of the exhaust system and the at least one bypass line are blocked. On account of the fact that the bypass line can be closed off by the device for throttling the exhaust-gas flow, the complex switching valves used in conventional throttle devices are dispensed with.

According to a further aspect of the present invention, the regulation of the exhaust-gas counter-pressure and of the charge air pressure is carried out, in addition to the regulation by the device for throttling the exhaust-gas flow, by a unit for charge pressure regulation.

According to a further aspect of the present invention, the unit for charge pressure regulation is formed by at least one wastegate which in particular bypasses the exhaust-gas turbine.

Corresponding to a further concept of the present invention, in addition or as an alternative to the device according to the invention and to the method according to the invention for engine braking, there is provided a further method and a further device for carrying out a method for engine braking of an engine operating preferably on the diesel principle, which engine has, per cylinder, at least one outlet valve connected to an outlet system, in which outlet system is installed a throttle device which, for engine braking, is actuated in such a way that the exhaust-gas flow is throttled and a pressure increase in the exhaust gas is thus generated upstream of the throttle device, which exhaust gas flows back into the combustion chamber after an intermediate opening of the outlet valve and serves to provide an increased engine braking action during the subsequent compression stroke with the outlet valve still held partially open, wherein during engine braking, an intermediate opening of the outlet valve effected by the pressure increase generated in the exhaust gas when the throttle device is in the throttling position is subjected to a control-based intervention by virtue of the outlet valve, which tends toward closing after the intermediate opening, being forcibly prevented from closing, and then being held partially open at the latest until the cam-controlled outlet valve opening, by the interception of a control unit installed remote from the camshaft in the outlet valve actuating mechanism, wherein the engine also has at least one exhaust-gas turbocharger having an exhaust-gas turbine acted on by an exhaust-gas flow and having a charge air compressor, which exhaust-gas turbine and charge air compressor are arranged on a common shaft, having an exhaust manifold which conducts the exhaust-gas flow from outlet valves of the engine to the exhaust-gas turbocharger, and having a device for throttling the exhaust-gas flow arranged between the outlet valves and the exhaust-gas turbocharger, and also having at least one bypass line for conducting the exhaust-gas flow past the device for throttling the exhaust-gas flow, the exhaust-gas flow being conducted through the at least one bypass line to at least one turbine wheel of the exhaust-gas turbine, the exhaust-gas flow being throttled and a pressure increase in the exhaust gas thus being generated upstream of the device for throttling the exhaust-gas flow, and a measurement of an exhaust-gas counter-pressure and of a charge air pressure taking place, wherein on the basis of the measurement of the exhaust-gas counter-pressure and of the charge air pressure, a position of the device for throttling the exhaust-gas flow to obtain a predetermined braking action is determined, and regulation of the exhaust-gas counter-pressure and of the charge air pressure is carried out by means of the device for throttling the exhaust-gas flow corresponding to the determined position of the device for throttling the exhaust-gas flow.

According to a further aspect of the present invention, at the end of the expansion stroke, when the control of the outlet valve by the camshaft takes effect again, the holding function of the control unit which previously acted as a hydraulically blocked buffer is eliminated, and then the opening of the outlet valve up to its full stroke, the holding of the outlet valve and the closing of the outlet valve again during the exhaust stroke are controlled by the associated normal outlet valve control cam via the outlet valve actuating mechanism with the control unit which then acts therein only as a mechanical buffer.

According to another aspect of the present invention, the control unit is installed and acts in a rocker arm mounted on the cylinder head and has a control piston, which is movable with low leakage in a bore of the rocker arm axially between two end positions delimited mechanically by stops and which acts at the front on the rear end surface of the outlet valve shank and which is acted on at the rear side by a compression spring and hydraulically, and a control bush which is screwed into a threaded section of the same rocker arm bore and in whose pressure chamber, which is open in the forward direction toward the control piston, is installed the compression spring acting on the control piston and a check valve, which check valve permits only the introduction of pressure medium from a pressure medium supply duct and has a compression-spring-loaded closing member. The pressure medium supply duct is supplied with pressure medium via a feed duct within the rocker arm, wherein a relief duct leads from the pressure chamber through the control bush to the upper end of the latter, the outlet opening of which relief duct is held closed during a braking process in the interception and holding phase of the control unit, for the purpose of building up and holding the pressure medium pressure in the pressure chamber and for an associated deployment and holding of the control piston in the deployed outlet valve interception position, by a stop arranged fixed on the cylinder cover.

According to a further aspect of the present invention, during a braking process, during the exhaust-gas-counter-pressure-induced intermediate opening of the outlet valve, the control piston is pushed out into its deployed end position on account of the forces acting in the pressure chamber and following the outlet valve shank, and as a result the pressure chamber which becomes larger in volume is filled with pressure medium, and therefore the control piston is subsequently hydraulically blocked in the outlet valve interception position and in the position, by means of the end surface thereof, intercepts and correspondingly holds open the outlet valve which is moving in the closing direction.

According to a further aspect of the present invention, the return of the control piston from its outlet valve interception position into its retracted basic position at the end of the holding phase takes place in that, upon the actuation of the rocker arm by the camshaft with the normal outlet cam directly or indirectly via a push rod, as a result of the pivoting of the rocker arm away from the cylinder-cover-side stop, the outlet opening of the relief duct within the control bush at the upper end of the control bush is opened up, and therefore the pressure medium situated in the pressure chamber is relieved of pressure and is released from the volume of the control piston which can now move back and is no longer blocked by the rocker arm, the release taking place until the control piston has assumed its fully retracted basic position.

According to a further aspect of the present invention—applied to an internal combustion engine with an underlying camshaft from which the actuation of an outlet valve takes place via a push rod and a subsequent rocker arm—the control unit acts in the chamber between the push rod and force introduction member of the rocker arm in a holding sleeve arranged in or on the cylinder head, and the control unit has a control sleeve coaxially movable with low leakage in the holding sleeve and supported on the upper end of the push rod and has a control piston installed so as to be coaxially movable with low leakage in a blind bore of the control sleeve, which control piston is supported at the top on a thrust transmission part articulatedly connected to the force introduction member of the rocker arm and is acted on at the bottom by a compression spring which acts in the direction of the thrust transmission part, which compression spring is installed in that part of the blind bore provided below the control piston and the hydraulic pressure chamber thus delimited, which pressure chamber is supplied with pressure medium, in particular engine oil, via a feed duct within the cylinder head or block and via a feed duct within the holding sleeve and via a supply duct, which communicates with the feed duct within the holding sleeve, within the control sleeve, wherein a check valve installed in the pressure chamber prevents, by means of its spring-loaded closing member, a return flow of pressure medium from the pressure chamber into the supply duct.

According to a further aspect of the present invention, during a braking process, during the exhaust-gas-counter-pressure-induced intermediate opening of the outlet valve, the control piston is deployed on account of the forces acting in the pressure chamber, and here, the rocker arm is made to perform a follow-up movement, wherein during the deployment of the control piston, after a stroke travel coordinated with the spring-open stroke of the outlet valve, the outlet opening of a relief duct within the control piston is opened up by emerging from the blind bore in the control sleeve, and the pressure medium within the pressure chamber is relieved of pressure via the relief duct, and in that, at the start of the subsequent closing movement of the outlet valve, the control piston is moved in the direction of its non-deployed basic position again by means of the rocker arm which has performed a corresponding follow-up movement and the thrust transmission part until the outlet opening of the relief duct is closed again by the wall of the blind bore, as a result of which the pressure chamber is shut off again, the control unit is therefore hydraulically blocked, and the outlet valve remains held intercepted in the corresponding partially open position.

According to a further aspect of the present invention, the elimination of the hydraulic blocking of the control piston in the control sleeve and the return of the control piston out of the outlet valve interception position into its non-deployed basic position take place when, during actuation of the push rod by the camshaft with the normal outlet cam, and the associated stroke of the control sleeve, after a certain stroke, coordinated with the maximum opening stroke of the outlet valve, of the control sleeve, as a result of the emergence thereof from the holding bore of the holding sleeve, the outlet cross section of a relief bore extending transversely from the pressure chamber is opened up, the pressure medium situated in the pressure chamber is relieved of pressure and is released from the volume of the control piston which can now move back, the release taking place until the control piston has assumed its fully retracted basic position, attained when the thrust transmission part sets down on the end side of the control sleeve.

According to a further aspect of the present invention, the outlet valve, after the exhaust-gas-counter-pressure-induced intermediate opening, is held in an interception position, the distance of which from the closed position amounts to approximately ⅕ to 1/20 of the full camshaft-controlled outlet valve opening stroke.

According to a further aspect of the present invention, the control unit is also taken into consideration as a hydraulic valve play compensating element, a degree of play occurring in the valve actuating mechanism being compensated by means of corresponding pressure medium replenishment into the pressure chamber with corresponding follow-up movement of the control piston in the direction of the member to be acted on.

Other features which are considered as characteristic for the invention are set forth in the appended claims.

Although the invention is illustrated and described herein as embodied in a method for engine braking, it is nevertheless not intended to be limited to the details shown, since various modifications and structural changes may be made therein without departing from the spirit of the invention and within the scope and range of equivalents of the claims. It will also be understood as self-evident that the disclosed features of the invention may be combined with one another in any desired combination in order to realize further advantages and embodiments of the invention.

The construction and method of operation of the invention, however, together with additional objects and advantages thereof will be best understood from the following description of specific embodiments when read in connection with the accompanying drawings.

Further properties and advantages of the invention will emerge from the following description of embodiments of the invention with reference to the appended figures. The described exemplary embodiments or embodiments should be understood merely as examples and not as being in any way restrictive.

DETAILED DESCRIPTION OF THE INVENTION

Figure 1:
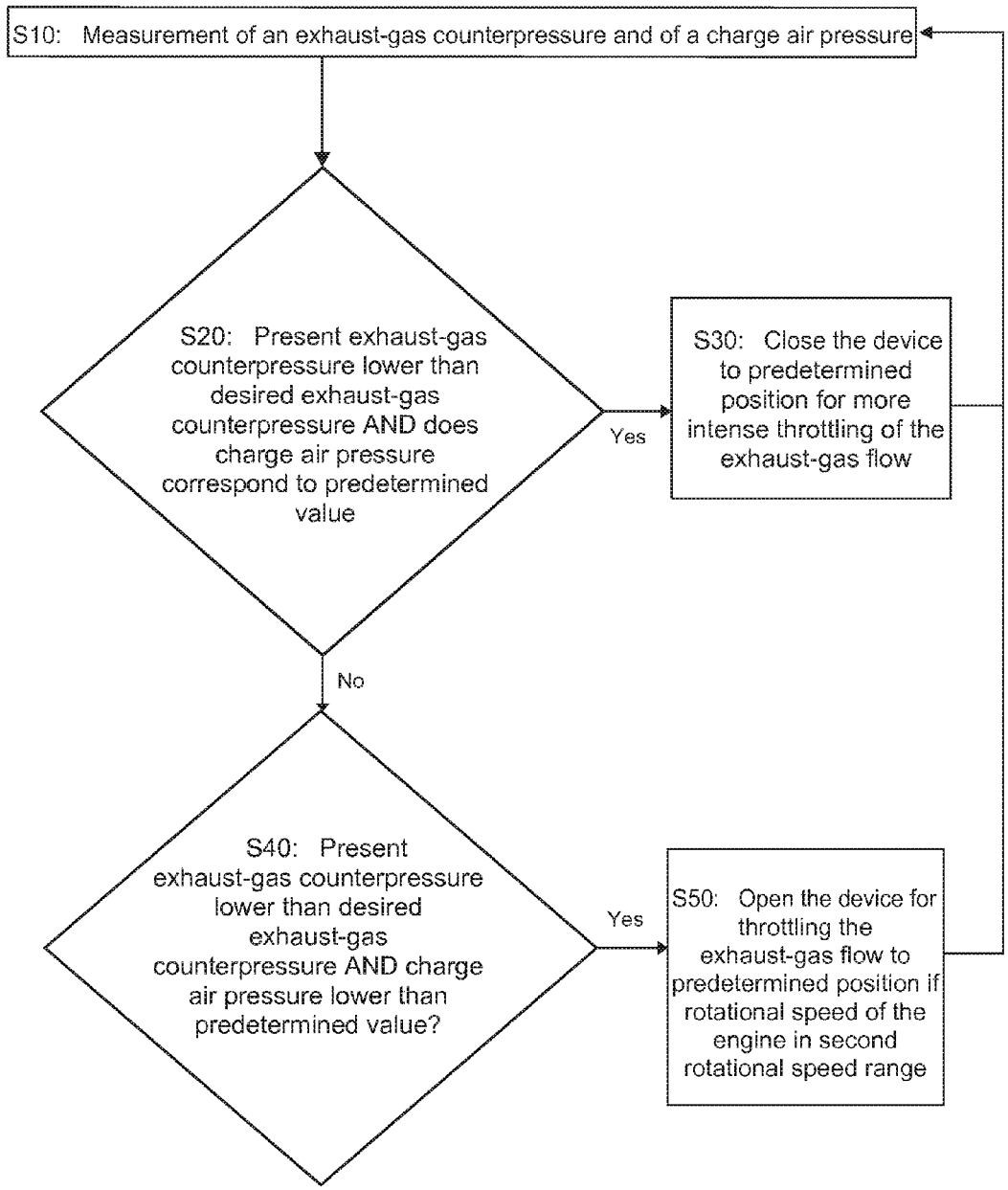
FIG. 1 shows a flow diagram of an example of the method according to the invention for engine braking.

Referring now to the figures of the drawing in detail and first, particularly, to FIG. 1 thereof, there is shown a flow diagram of an example of the method according to the invention for engine braking. Referring further to FIG. 9, a measurement of an exhaust-gas counter-pressure and of a charge air pressure firstly takes place in step S10. The measurement of the static and/or dynamic pressure of the charge air takes place for example by means of at least one pressure sensor P which is of known design and which is arranged in the region between the engine M or cylinders 101 and the charge air compressor 105. The measurement of the static and/or dynamic pressure of the exhaust gas takes place for example by means of at least one pressure sensor P which is of known design and which is arranged in the region between the engine M or the outlet valves 102 of the cylinders 101 of the engine M and the throttling device 4 for throttling the exhaust-gas flow and/or in the region between the device 4 for throttling the exhaust-gas flow and the exhaust-gas turbine 106.

In step S20, it is determined whether the measured, that is to say present exhaust-gas counter-pressure is lower than a desired exhaust-gas counter-pressure and a charge air pressure corresponds to a predetermined value. In the case of a positive determination, in step S30, a throttling device 4 for throttling an exhaust-gas flow is closed into a predetermined position, wherein even in the case of a complete closure of the throttling device 4 for throttling the exhaust-gas flow, a charge air pressure is generated by means of the exhaust-gas flow which is conducted via bypass lines 5a, 5b past the device 4 for throttling the exhaust-gas flow and which is conducted to at least one turbine wheel of an exhaust-gas turbocharger 106, because the exhaust-gas turbine 106 is mechanically connected to the charge air compressor 105.

In the case of a negative determination, it is further determined in step S40 whether the measured, that is to say present exhaust-gas counter-pressure is lower than a desired exhaust-gas counter-pressure and a charge air pressure is lower than a predetermined value.

In the case of a positive determination, in step S50, the device 4 for throttling the exhaust-gas flow is opened into a predetermined position if the rotational speed of the engine M lies in a second rotational speed range which is higher than or equal to for example 1400 revolutions per minute. If the rotational speed of the engine M lies in a first rotational speed range which is for example lower than 1400 revolutions per minute, the throttling device 4 for throttling the exhaust-gas flow is in a first closed position in which the cross section of an exhaust system is blocked and the exhaust-gas flow is conducted through the bypass lines 5a, 5b past the device 4 for throttling the exhaust-gas flow. The device 4 for throttling the exhaust-gas flow is opened only when the rotational speed of the engine M overshoots the first rotational speed range.

In steps S30 and S50, therefore, regulation of the exhaust-gas counter-pressure and of the charge air pressure is carried out by using the bypass lines 5 to conduct the exhaust-gas flow past the device 4 for throttling the exhaust-gas flow and/or by adjusting the device 4 for throttling the exhaust-gas flow corresponding to a determination of the optimum position of the device 4 for throttling the exhaust-gas flow.

In addition to the measurement of the exhaust-gas counter-pressure and of the charge air pressure, the position of the device 4 for throttling the exhaust-gas flow may also be directly measured by means of sensors of known design. This would additionally improve regulation, and it would then be possible for the throttle device 4 for throttling the exhaust-gas flow to be set more efficiently to predefined positions.

Figure 2:
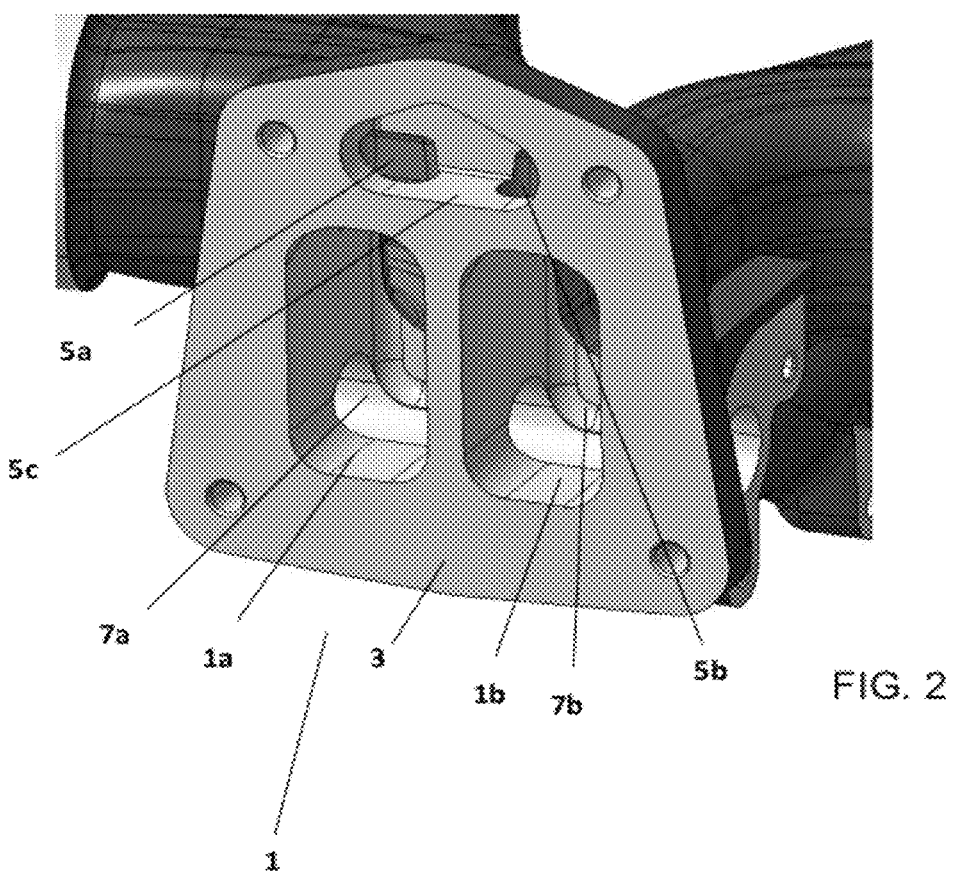
FIG. 2 shows an illustration of an example of an exhaust-gas tract of a device according to the invention for engine braking.

FIG. 2 shows an illustration of an example of an exhaust-gas tract 1 of a device for engine braking according to the invention. The exhaust-gas tract 1 is composed of a first exhaust-gas collecting tract 1a and a second exhaust-gas collecting tract 1b and has, on its end side, a flange 3 for fastening to an exhaust-gas turbocharger 106 (see FIG. 9).

The first exhaust-gas collecting tract 1a has a first bypass line 5a which is supplied through a short branch duct from the exhaust-gas collecting tract 1a. The first exhaust-gas collecting tract 1a also has a cutout 7a for receiving a device 4 for throttling an exhaust-gas flow. The second exhaust-gas collecting tract 1b has a second bypass line 5b which is supplied through a short branch duct from the exhaust-gas collecting tract 1b. The second exhaust-gas collecting tract 1b also has a cutout 7b for receiving the device 4 for throttling the exhaust-gas flow.

The first bypass line 5a and the second bypass line 5b open out into a common bypass line 5c which communicates with a nozzle bore 6 of the exhaust-gas turbocharger (see FIG. 9).

Figure 3:
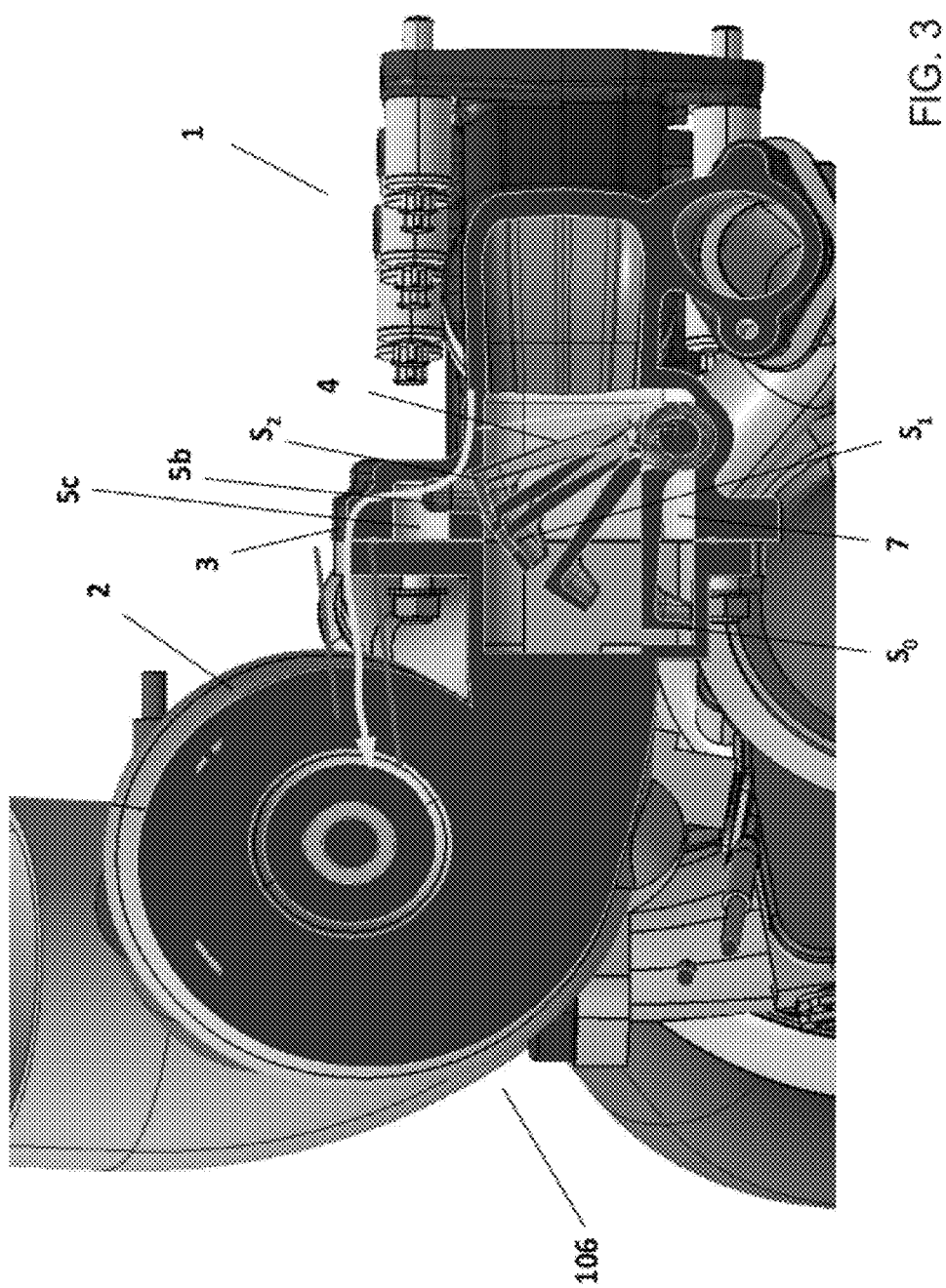
FIG. 3 shows a function diagram of the device according to the invention for throttling the exhaust-gas flow.

FIG. 3 shows a function diagram of the device 4 for throttling the exhaust-gas flow according to a preferred embodiment of the present invention. The exhaust-gas tract 1 of an engine M operating preferably on the diesel principle is fastened to a turbine wheel housing 2 of the exhaust-gas turbine 106 (see also FIG. 9) by means of a flange 3. The illustration shows in particular a cross section through the exhaust-gas collecting tract 1b from FIG. 2. The exhaust-gas flow passing through the exhaust-gas tract 1 impinges on the turbine wheel (not illustrated) of the exhaust-gas turbine 106 of the exhaust-gas turbocharger. Each of the exhaust-gas collecting tracts 1a, 1b has the device 4 for throttling the exhaust-gas flow, which is arranged between the engine M and the turbine wheel of the exhaust-gas turbocharger. According to the invention, a bypass line 5a, 5b branches off from each exhaust-gas collecting tract 1a, 1b, which bypass line communicates with the nozzle bore 6 in the turbine wheel housing 2 (see FIG. 9).

The device 4 for throttling the exhaust-gas flow is formed by a pivotable flap or two pivotable flaps and is formed in a cutout 7a, 7b of the respective exhaust-gas collecting tract 1a, 1b (see FIG. 2). The device 4 for throttling the exhaust-gas flow may however also alternatively be formed by at least one disk valve, at least one slide, at least one rotary slide or the like instead of at least one pivotable flap.

The device 4 for throttling the exhaust-gas flow can be moved in a continuously variable manner between an open position and two closed positions. In the open position $S_0$, the device 4 for throttling the exhaust-gas flow opens up the full cross section of the respective exhaust-gas collecting tract 1a, 1b. In a first closed position $S_1$, the device 4 for throttling the exhaust-gas flow blocks the full cross section of the respective exhaust-gas collecting tract 1a, 1b, but the bypass line 5a, 5b is open. If the device 4 for throttling the exhaust-gas flow is closed further into a second closed position $S_2$, it blocks both the respective exhaust-gas collecting tract 1a, 1b and also the bypass line 5a, 5b.

When the device 4 for throttling the exhaust-gas flow is partially closed, that is to say in a flap position between the open position $S_0$ and the first closed position $S_1$, the bypass line 5a, 5b which is arranged over the device 4 for throttling the exhaust-gas flow is subjected to the exhaust gas flow and conducts the latter through the common bypass line 5c to the turbine wheel via the nozzle bore 6 integrated in the turbine wheel housing 1. The cross section of the bypass line 5a, 5b is significantly smaller than the cross section of the exhaust-gas collecting tract 1a, 1b, such that when the device 4 for throttling the exhaust-gas flow is partially closed, a relatively small proportion of the exhaust-gas flow is conducted through the bypass line 5a, 5b.

If the device 4 for throttling the exhaust-gas flow is in the first closed position $S_1$, the bypass line 5a, 5b however constitutes the only flow path for the exhaust gas to the turbine wheel. On account of the small cross section of the bypass line 5a, 5b or of the common bypass line 5c, there is a high counter-pressure, such that only a correspondingly small proportion of the exhaust-gas flow passes to the turbine wheel, but does so at a high flow speed and therefore with high impetus. In this way, a drop in the rotational speed of the turbine wheel and of a compressor wheel is prevented, such that the engine M continues to be supplied with compressed air at the inlet side despite being at a low rotational speed, and the effectiveness of the engine brake is increased.

Figure 4:
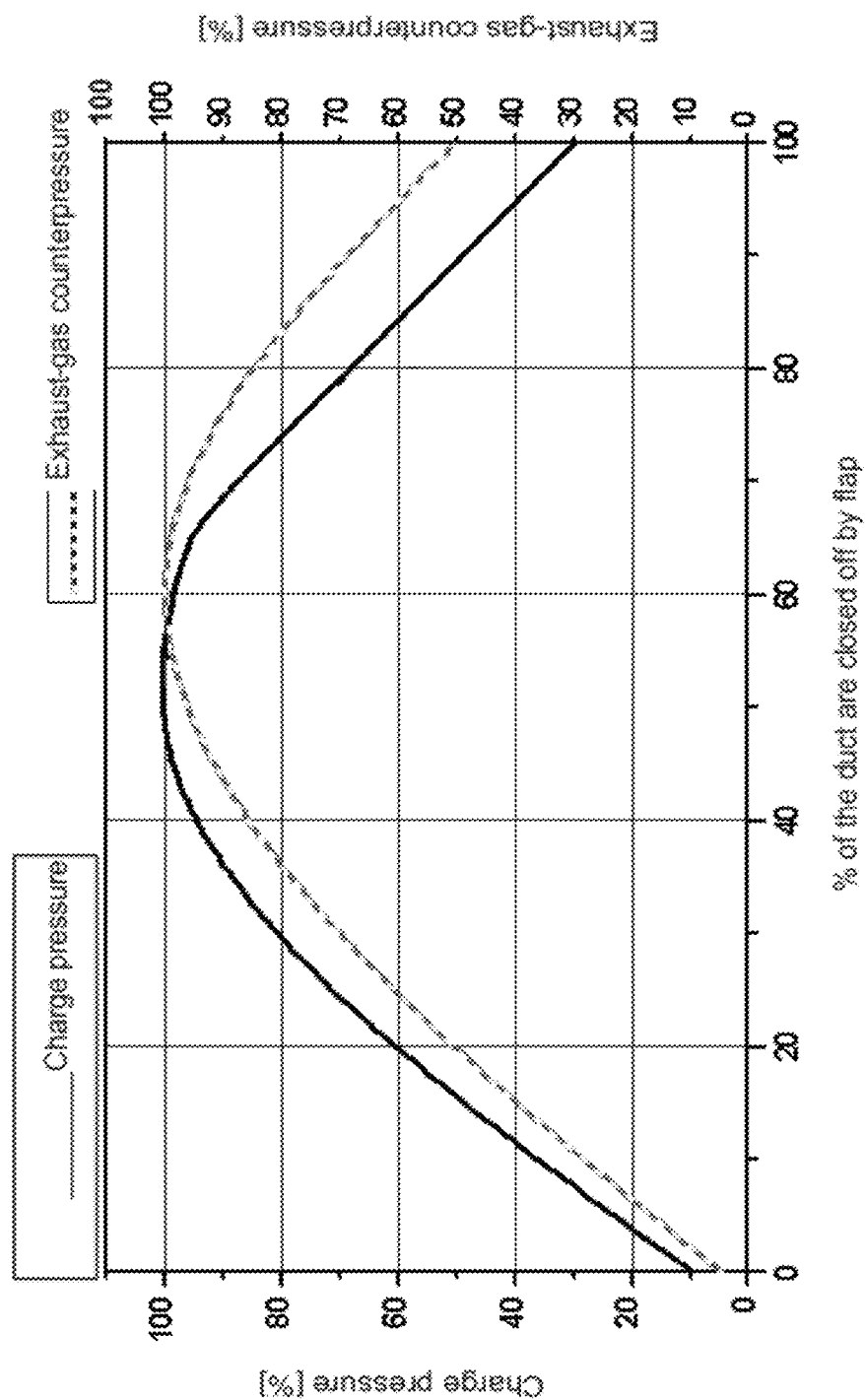
FIG. 4 shows a diagram of a profile of charge air pressure and exhaust-gas counter-pressure in relation to the position of the device for throttling the exhaust-gas flow.
Figure 6:
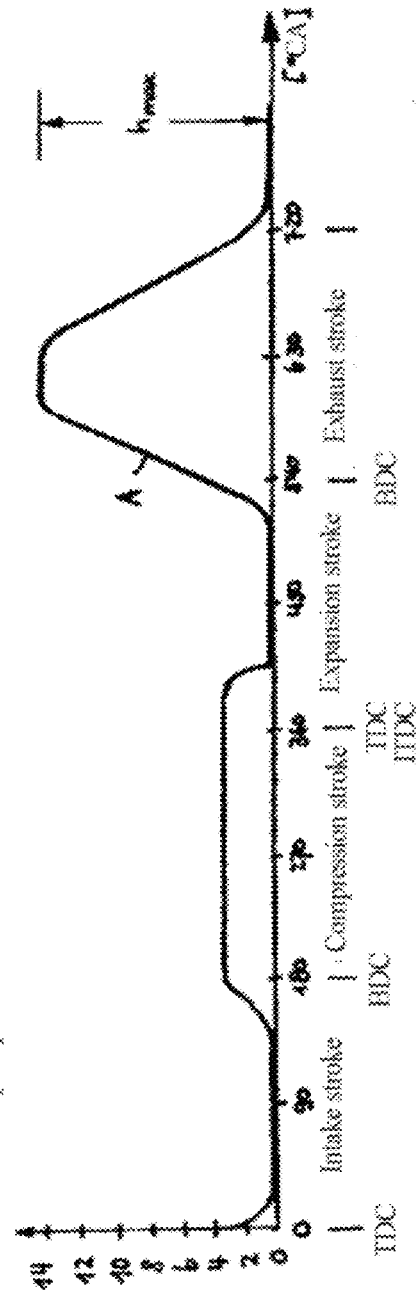
FIG. 6 shows a diagram illustrating the stroke profile of an outlet valve in a braking method known from DE 39 22 884 C2.

FIG. 4 shows a diagram of a profile of charge air pressure and exhaust-gas counter-pressure in relation to the position of the device 4 for throttling the exhaust-gas flow at a maximum braking rotational speed, that is to say engine rotational speed during braking operation.

The charge air pressure begins at a level of approximately 30% of the maximum value when the device 4 for throttling the exhaust-gas flow is fully closed in the braking mode. The charge air pressure when the device 4 for throttling the exhaust-gas flow is fully closed results from the exhaust-gas flow conducted through the bypass lines 5a, 5b, 5c past the device 4 for throttling the exhaust-gas flow, which exhaust-gas flow is conducted to the turbine wheel of the exhaust-gas turbocharger and therefore generates a charge air pressure. The level of the charge air pressure of 30% therefore corresponds to the maximum charge air pressure that can be generated through the bypass lines 5a, 5b. The exhaust-gas counter-pressure begins at approximately 50% of the maximum value when the device 4 for throttling the exhaust-gas flow is fully closed, which corresponds to the exhaust-gas counter-pressure generated by the engine in conjunction to the component of the exhaust-gas counter-pressure generated on account of the charge air pressure. As the device 4 for throttling the exhaust-gas flow opens, the charge air pressure then rises to a maximum, which is reached here when the device 4 for throttling the exhaust-gas flow is approximately half open. As the device 4 for throttling the exhaust-gas flow opens further, the charge air pressure falls again on account of the decreasing gas throughput, until the charge air pressure returns to a very low level when the device 4 for throttling the exhaust-gas flow is fully open. The exhaust-gas counter-pressure rises approximately in parallel with the charge air pressure and reaches its maximum at a slightly further closed position of the device 4 for throttling the exhaust-gas flow than the charge air pressure, and then likewise falls to a very low level when the device 4 for throttling the exhaust-gas flow is fully open.

For a certain desired exhaust-gas counter-pressure at a braking part load, there are usually two associated possible positions of the device 4 for throttling the exhaust-gas flow. Here, the more expedient position is always the position with the higher charge pressure. A regulator detects the correct position of the device 4 for throttling the exhaust-gas flow from a comparison of the present charge pressure with a setpoint charge pressure from a characteristic map, and always regulates in the direction of that position of the device 4 for throttling the exhaust-gas flow which provides the exhaust-gas counter-pressure with the higher charge air pressure.

Identical or corresponding parts are denoted by the same reference numerals in FIGS. 7A-7D.

If the associated 4-stroke reciprocating piston internal combustion engine, those figures show only the shank of an outlet valve 10 and the associated valve actuating mechanism, insofar as is necessary for the understanding of the invention.

The 4-stroke reciprocating piston internal combustion engine basically has, per cylinder, at least one outlet valve connected to an outlet system. The outlet valves can be controlled, for gas exchange processes by a conventional camshaft, via corresponding valve actuating mechanisms. Associated with the outlet valve is a rocker arm 30 which is mounted in the cylinder head 20 and which, depending on the manner in which the camshaft is arranged on the engine, can be actuated by the camshaft either directly or indirectly via a push rod 40. The outlet valve 10 which is guided with its shank in the cylinder head 20 is acted on permanently in the closing direction by a closing spring (not illustrated). Installed in the outlet system is a throttle device, for example a throttle flap, which is actuated via an associated controller for engine braking in such a way that the exhaust-gas flow is throttled, and a pressure increase in the exhaust gas is thus generated upstream of the throttle device. The pressure waves generated during the discharging of adjacent cylinders are superposed on the steady-state back pressure and, as a result of the positive pressure difference, cause an intermediate opening of the outlet valve 10—see phase A1 in the diagram according to FIG. 5. According to the invention, the outlet valve intermediate opening, which takes place independently of the control of the camshaft, is subjected, during braking operation, to a control-based intervention by virtue of the outlet valve 10, which tends toward closing again under the action of its closing spring after the intermediate opening, being forcibly intercepted by a control unit 50 installed remote from the camshaft in the outlet valve actuating mechanism, and then being held in the partially open interception position by means of the control unit over the entire compression stroke and expansion stroke—see phase A2 in the diagram according to FIG. 5.

The control unit 50 may be realized in a variety of ways and installed at different points of the outlet valve actuating mechanism. Examples of this are shown in FIGS. 7A-7D.

In the example according to FIGS. 7A-7D, the control unit 50 is installed and acts in the rocker arm 30 and is composed of two main members, specifically a control piston 60 and a control bush 70. The control piston 60 is movable with low leakage in a bore 80 of the rocker arm 30 axially between two end positions delimited by stops 90, 100, and acts at the front via a curved end surface 110 on the rear end surface 120 of the outlet valve shank, and at the rear side is acted on by a compression spring 130 and can also be subjected to hydraulic pressure.

The control bush 70 is screwed into a threaded section of the same bore 80 in the rocker arm 30 above the control piston 60, and the control bush with its front end surface forms the rear stop 90 which defines the retracted basic position of the control piston 60. The deployed end position of the control piston 60 is delimited by the front stop 100 formed by the rear edge of an encircling groove on the control piston 60, into which groove engages a stroke limiting member 140 fastened to the rocker arm 30.

The control bush 70 has a pressure chamber 150 which is open in the forward direction toward the control piston 60 and in which are installed the compression spring 130 acting on the control piston 60 and a check valve which permits only the introduction of pressure medium from a pressure medium supply duct 160 and has a compression-spring-loaded closing member 170. The pressure medium supply duct 160, which is within the control bush and which is composed of a transverse bore and a bore which proceeds from the transverse bore and opens out centrally into the pressure chamber 150, is supplied with pressure medium, in this case lubricating oil, at a certain pressure from the rocker arm bearing region 190 via a feed duct 18 within the rocker arm. Furthermore, a relief duct 200 leads from the pressure chamber 150 through the control bush 70 and into an insert piece 190 fixedly installed in the control bush, the outlet opening of the relief duct at the insert piece side being held closed during a braking process in the interception and holding phase (A2) of the control unit 50, for the purpose of building up and holding the pressure medium pressure in the pressure chamber 15 and for an associated deployment and holding of the control piston 60 in the deployed outlet valve interception position, by a stop 220 arranged fixed on the cylinder cover 210.

A complete cycle during engine braking will be discussed below with reference to the figure sequence 7A-7B-7C-7D.

Figure 5:
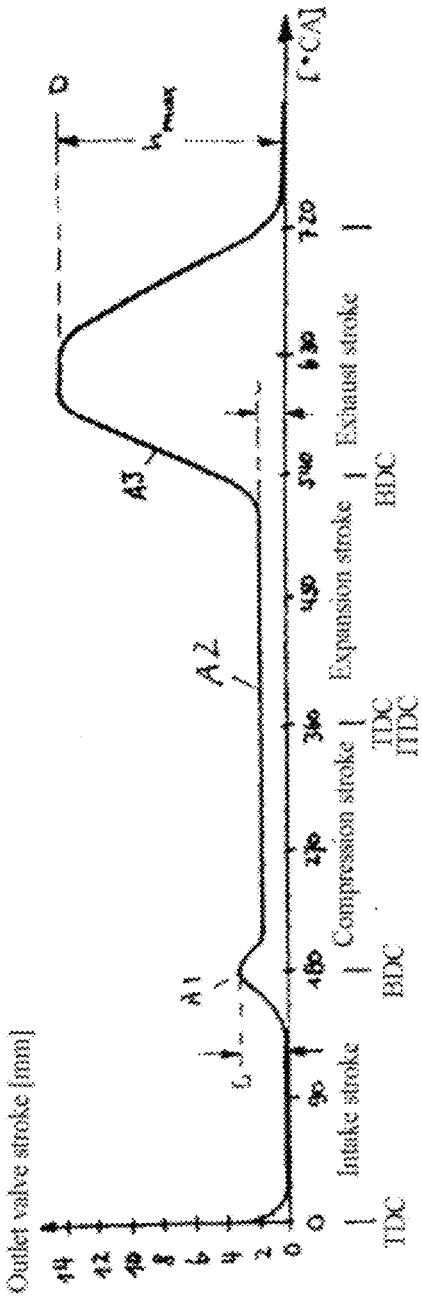
FIG. 5 shows a diagram illustrating the stroke profile of an outlet valve during the braking operation in an application of the braking method according to a further embodiment of the invention.
Figure 7A:
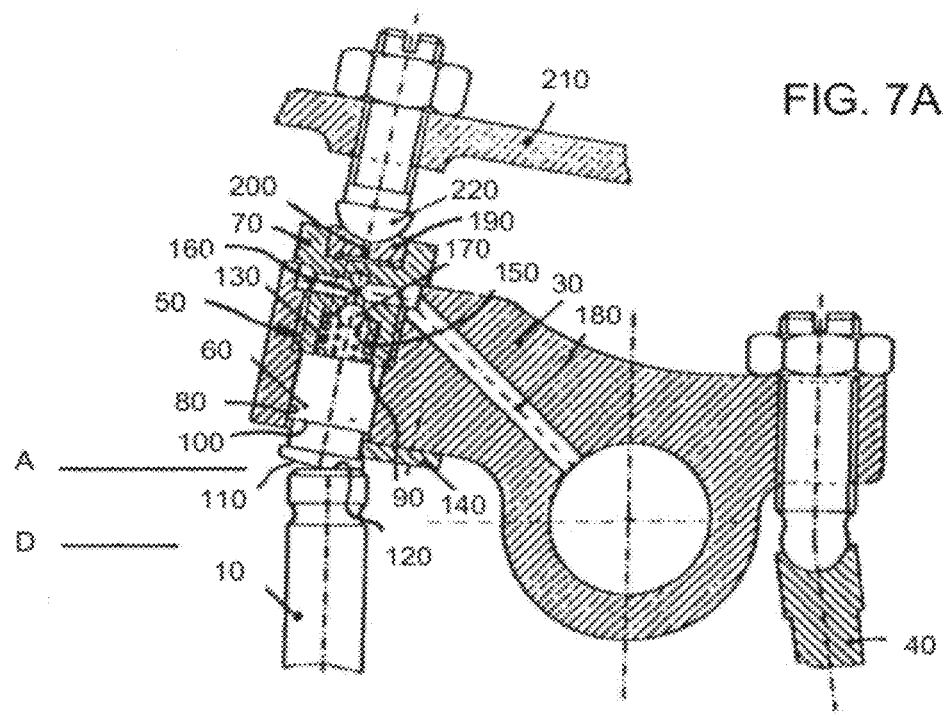
FIGS. 7A-7D each show a detail of an outlet valve actuating mechanism with a further embodiment of a control unit according to the invention in an operating position during braking operation according to the invention.

Here, FIG. 7A shows the outlet valve 10 in the closed position A at the start of the intake stroke (in this regard, see also the diagram in FIG. 5). In the phase, the control unit 50 acts within the rocker arm 30 as a mechanical buffer, the control piston 60 being pushed into the retracted position from below by the outlet valve 1, and the control bush 70 being supported via its insert piece 190 against the stop 220. Any valve play is overcome by means of a partial deployment of the control piston 60.

Figure 7B:
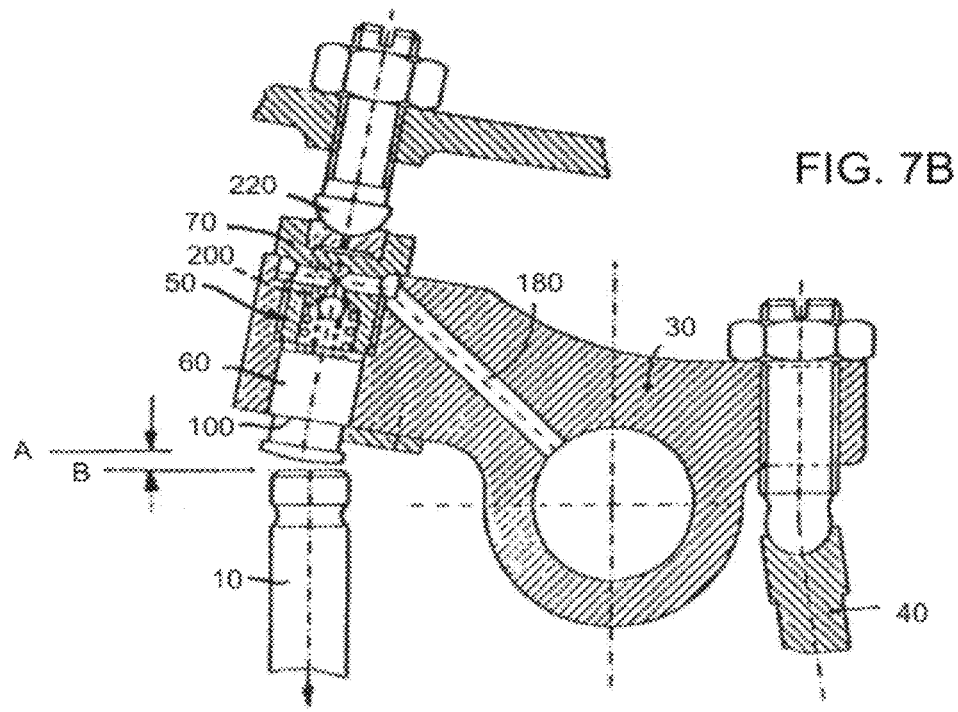

FIG. 7B shows the conditions at the instant when the outlet valve 10 has reached its maximum stroke B in phase A1 (see diagram in FIG. 5) during the exhaust-gas-counter-pressure-induced intermediate opening during engine braking. During the intermediate opening of the outlet valve 10, the latter lifts from the control piston 60 and the latter is deployed, caused to perform a follow-up movement by the compression spring 130, into its interception position. This is associated, because the control piston 60 moves away from the control bush 70, with an enlargement of the pressure chamber 150 and a filling of the latter with pressure medium via the pressure medium supply duct 160, wherein after the pressure chamber has been completely filled, the control piston 160 is hydraulically blocked in its deployed interception position (predefined by stop 100) firstly on account of the blocking check valve 170 and secondly on account of the shut-off outlet opening of the relief duct 200. The state is shown in FIG. 7B. It can also be seen from FIG. 7B that the outlet valve 10, during the intermediate opening, leads the control piston stroke with a greater stroke A-B.

Figure 7C:
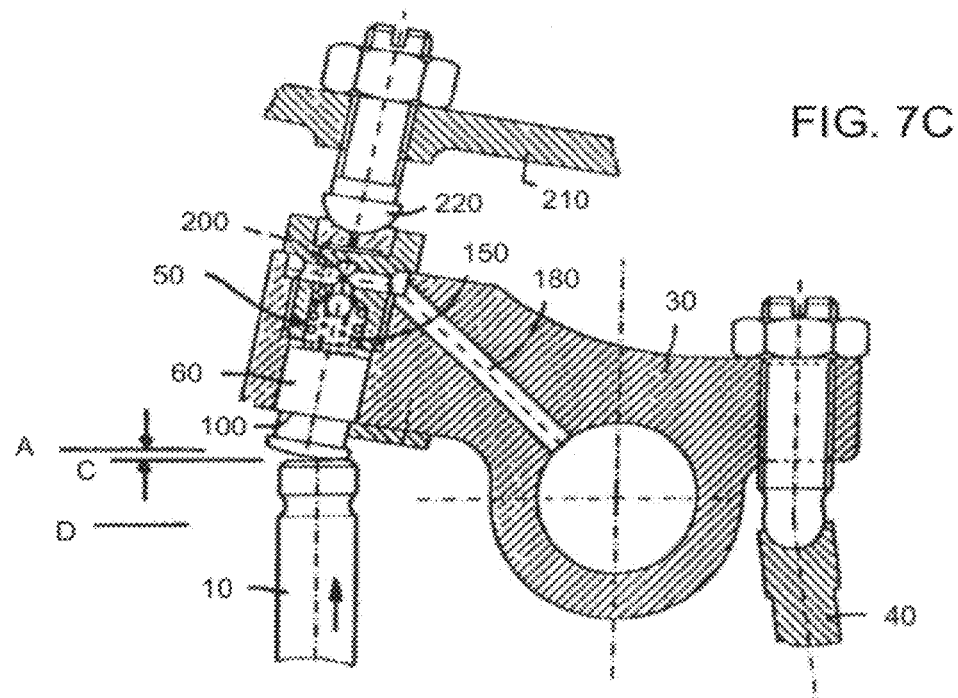

At the transition from phase A1 to phase A2, the outlet valve 10 moves in the closing direction again, but is then intercepted again by the hydraulically blocked control unit 50 already after a short travel B-C. FIG. 7C shows the interception position C under substantially the same conditions as in FIG. 7B, which interception position C is maintained over the entirety of the remaining compression stroke and following expansion stroke.

Only when the camshaft-based control of the outlet valve 10 by means of the associated outlet cam takes effect again at the end of the expansion stroke is the preceding hydraulic blocking of the control unit 50 eliminated, because when the rocker arm 3 is moved in the direction for opening the outlet valve, the control bush 70 lifts with its insert piece 190 from the stop 220. In this way, the relief duct 200 is opened up and pressure medium can flow out of the pressure chamber 150 of the control unit 50, which is now no longer blocked, specifically under the action of the control piston 60 pushed in the direction of its retracted basic position by the outlet valve 10.

Figure 7D:
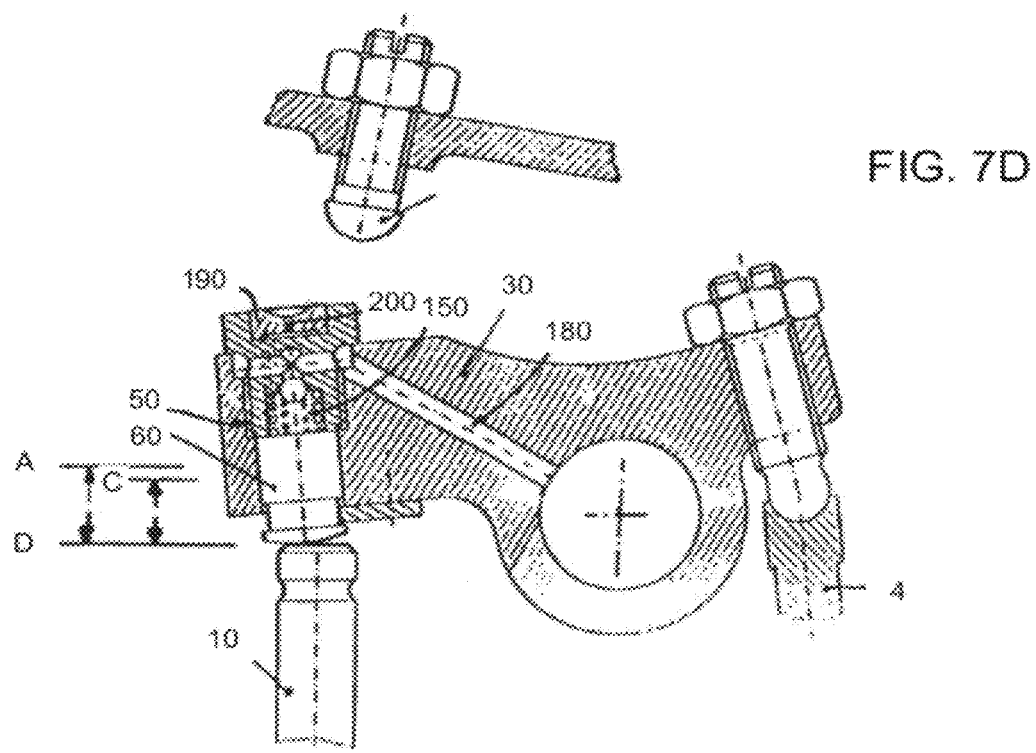

When the control piston 60 is fully retracted, the control device 50 again acts only as a purely mechanical buffer on the rocker arm 30, by means of which then, in phase A3 (see diagram in FIG. 5), during the exhaust stroke during engine braking, the outlet valve 10 is opened up to the full outlet valve stroke D—the position being shown in FIG. 7D—, the holding and re-closing of the outlet valve being controlled by the associated outlet control cam of the camshaft.

At the end of the exhaust stroke during engine braking, the rocker arm 30 with the control unit 50 again assumes the position shown in FIG. 7A, proceeding from which the next braking cycle takes place.

Figure 8:
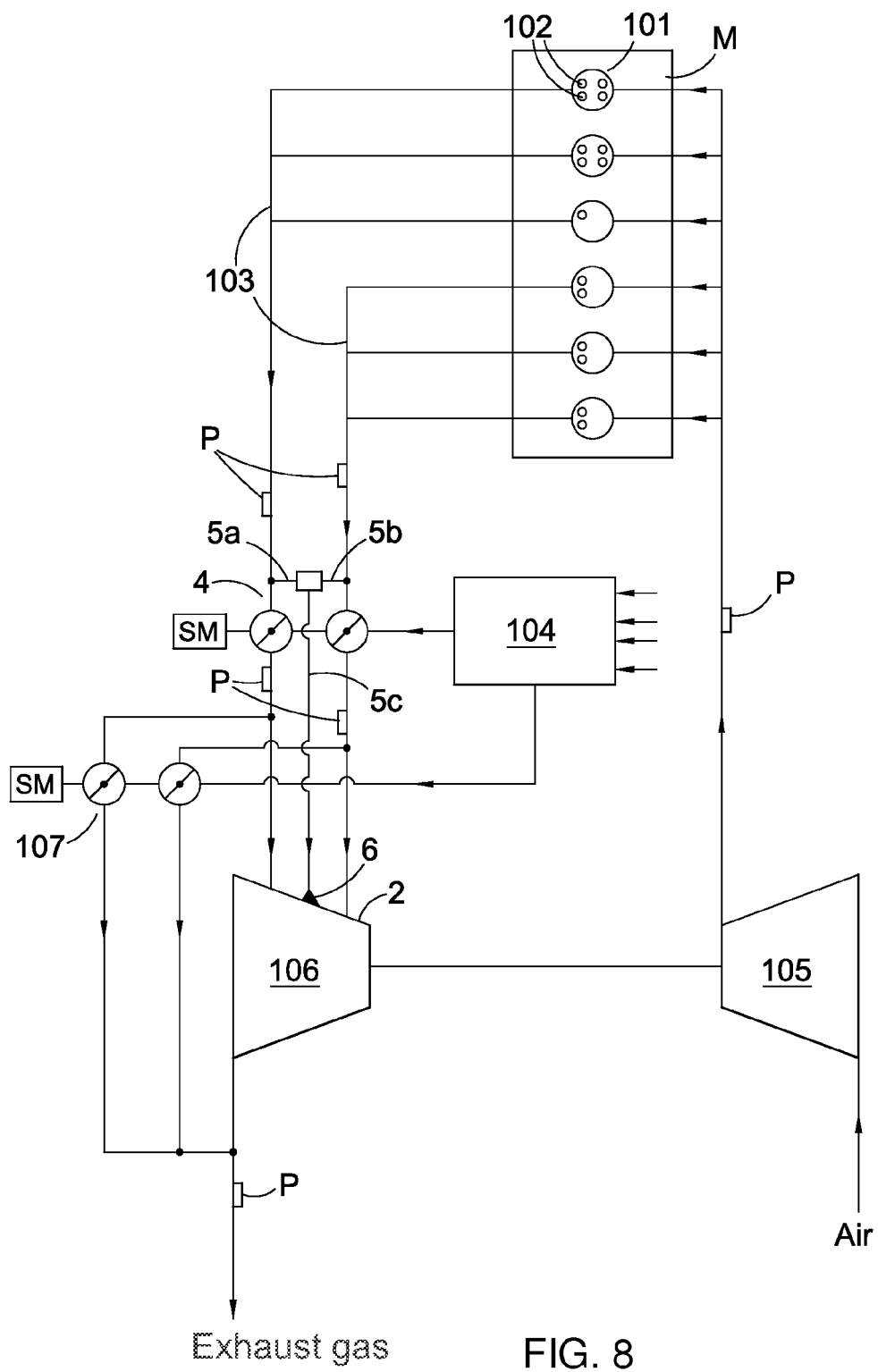
FIG. 8 shows a function diagram of the device according to the invention for throttling the exhaust-gas flow, with a unit for charge pressure regulation.

FIG. 8 shows an overview or a function diagram of an example of the device according to the invention for engine braking of a multi-cylinder internal combustion engine or multi-cylinder engine M comprising a throttle device 4 and a further unit for charge pressure regulation 107.

The engine M illustrated in FIG. 8 acts preferably on the diesel principle and comprises six cylinders 101. Each of the cylinders 101 has at least one outlet valve 102. The engine M also has an exhaust-gas turbocharger comprising a charge air compressor 105 and an exhaust-gas turbine 106. The exhaust-gas turbocharger may be of single-stage or multi-stage design.

The charge air compressor 105 is connected to the air inlet region of the engine M, or the cylinders 101 of the engine M, via a duct system. The charge air compressor 105 is driven by the exhaust-gas turbine 106 via a mechanical connection, preferably via a shaft. Situated between the air inlet region or the cylinders 101 of the engine M and the charge air compressor 105 is at least one pressure sensor P of known design, which determines or measures the static and/or dynamic pressure of the air inducted and subsequently compressed by the charge air compressor 105. An air filter (not illustrated in FIG. 8) for removing corresponding particles of a certain type and size from the air may additionally be provided or arranged upstream of the charge air compressor 105.

At its outlet side, the engine M has at least one exhaust manifold 103 which is connected to the at least one outlet valve 102 of each cylinder 101. The exhaust manifold 103 is also connected to the exhaust-gas turbine 106 of the exhaust-gas turbocharger. Between the engine M or the exhaust manifold 103 and the exhaust-gas turbine 106, the device for engine braking has a device 4 for throttling the exhaust-gas flow. Here, the throttle device 4 comprises for example throttle flaps 4 which, as a result of their position in the housing of the throttle device, can influence the throughflow cross section of the exhaust-gas flow and therefore influence the exhaust-gas counter-pressure. Furthermore, the device for engine braking comprises at least one bypass line 5a, 5b which can conduct the exhaust-gas flow within a common bypass line 5c past the device 4 for throttling the exhaust-gas flow. The common bypass line 5c is connected to the exhaust-gas turbine 106 or the turbine wheel housing 2 via a nozzle bore 6 in the turbine wheel housing 2, such that in particular when the device 4 for throttling the exhaust-gas flow is closed, a reduced exhaust-gas flow can drive the exhaust-gas turbine 106 and therefore the charge air compressor 105.

The device 4, designed for example in the form of throttle flaps 4 for throttling the exhaust-gas flow, is controlled in terms of its position preferably by means of an actuating and/or control unit SM, 104, the throttle flaps 4 being mechanically connected to one another. At least one pressure sensor P of known design may be situated between the throttle device 4 and the engine M or the outlet valves 102 of the cylinders 101, which pressure sensor detects or measures the static and/or dynamic pressure of the exhaust gas. In addition or as an alternative thereto, at least one further pressure sensor P may be situated downstream of the throttle device 4.

As already stated in the introduction, the device according to the invention also comprises at least one further unit 107 for charge pressure regulation. The unit 107 for charge pressure regulation comprises at least one bypass line which, in terms of the exhaust-gas flow, bypasses the exhaust-gas turbine 106. The at least one bypass line also has at least one wastegate or one bypass valve. The exhaust gas can be branched off via the at least one bypass line upstream of the exhaust-gas turbine when the bypass valve is open, and the exhaust gas flows past the exhaust-gas turbine 106, for example into an exhaust-gas treatment system and/or silencer system. The at least one wastegate or bypass valve is controlled in terms of its action on the exhaust gas, or its pressure, by means of the actuating and/or control unit SM, 104.

If not the full braking action is required, the provided unit 107 for charge pressure regulation is used in addition or as an alternative to the regulation by means of the throttle device or the device 4 for throttling the exhaust-gas flow, because in this way the charge pressure and therefore the braking action can be set more quickly and sensitively. The charge air compressor 105 generates a predefined charge pressure in the cylinder 101 of the engine M, the exhaust-gas flow being supplied to the device 4 for throttling the exhaust-gas flow via the at least one outlet valve 102 of each cylinder 101 via the exhaust manifold 103.

At a certain engine rotational speed, a defined charge pressure is always set for a given position of the throttle device 4. As already stated, the bypass or supply lines of the unit 107 for charge pressure regulation are arranged in the exhaust-gas duct between the device 4 for throttling the exhaust-gas flow and downstream of the outlet of the exhaust-gas turbine 106. The unit 107 for charge pressure regulation conducts a predefined amount of the exhaust-gas flow past the exhaust-gas turbine 106, wherein the exhaust-gas flow conducted past the exhaust-gas turbine 106 opens out into the exhaust-gas duct again downstream of the exhaust-gas turbine 106.

Both the unit 107 for charge pressure regulation and also the device 4 for throttling the exhaust-gas flow are controlled by a control unit 104. If a charge pressure lower than a maximum charge pressure is to be set, the unit 107 for charge pressure regulation is opened to such an extent that the desired charge pressure is set. To attain the maximum braking action, the wastegate or bypass valve is closed, and regulation is carried out to attain maximum charge pressure.

According to a further embodiment of the invention, the regulation of the exhaust-gas counter-pressure and of the charge air pressure may be carried out, in addition to the regulation by the device 4 for throttling the exhaust-gas flow, by a unit 107 for charge pressure regulation. The unit 107 for charge pressure regulation is preferably formed by a wastegate.

The invention has been explained in more detail on the basis of examples, without being restricted to the specific embodiments.

The invention claimed is:

1. A method for engine braking of an engine, the engine having:
    at least one exhaust-gas turbocharger with an exhaust-gas turbine acted on by an exhaust-gas flow and a charge air compressor, the exhaust-gas turbine and the charge air compressor being commonly mounted on a common shaft;

an exhaust gas manifold disposed to conduct the exhaust-gas flow from outlet valves of the engine to the exhaust-gas turbocharger;
a throttling device for throttling the exhaust-gas flow between the outlet valves and the at least one exhaust-gas turbocharger; and
at least one bypass line for conducting the exhaust-gas flow past the throttling device;
the method which comprises:
conducting the exhaust-gas flow through the at least one bypass line to a turbine wheel of the exhaust-gas turbine, throttling the exhaust-gas flow and thus generating a pressure increase in the exhaust gas upstream of the throttling device for throttling the exhaust-gas flow, and taking a measurement of an exhaust-gas counter-pressure and of a charge air pressure;
determining, based on the measurement of the exhaust-gas counter-pressure and of the charge air pressure, a position of the throttling device to obtain a predetermined braking action; and
controlling the exhaust-gas counter-pressure and the charge air pressure by way of the throttling device in accordance with the determined position of the throttling device for throttling the exhaust-gas flow;
wherein the controlling step includes performing a determination that a current exhaust-gas counter-pressure lies below a desired exhaust-gas counter-pressure and the charge air pressure corresponds to a desired value, and in response to the determination, closing the position of the throttling device further; and
wherein the controlling step includes performing a further determination that the current exhaust-gas counter-pressure lies below the desired exhaust-gas counter-pressure and the charge air pressure lies below the desired value, and in response to the further determination, opening the position of the throttling device further.

2. The method according to claim 1, wherein an optimum position of the throttling device for throttling the exhaust-gas flow in a first rotational speed range of the engine is a closed position in which a cross section of an exhaust system is blocked and the exhaust-gas flow is conducted through the at least one bypass line past the throttling device.

3. The method according to claim 1, wherein an optimum position of the throttling device for throttling the exhaust-gas flow in a first rotational speed range of the engine is a closed position in which at least a part of a cross section of an exhaust system is opened up and at least a part of the exhaust-gas flow is conducted through the at least one bypass line past the throttling device.

4. The method according to claim 1, wherein an optimum position of the throttling device for throttling the exhaust-gas flow in a second rotational speed range of the engine is a closed position in which at least a part of the cross section of an exhaust system is opened up and a part of the exhaust-gas flow is conducted through the at least one bypass line past the throttling device.

5. The method according to claim 1, wherein a first rotational speed range of the engine is a rotational speed range below or equal to 1400 revolutions per minute, and a second rotational speed range of the engine is a rotational speed range greater than 1400 revolutions per minute, up to a maximum rotational speed of the engine.

6. The method according to claim 1, which comprises, in order to obtain a maximum braking action at a respective engine rotational speed, first setting a maximum charge air pressure and, after the maximum charge air pressure for the engine rotational speed is reached, carrying out a maximum exhaust-gas counter-pressure closed-loop control.

7. The method according to claim 1, wherein at least one predetermined position of the throttling device for throttling the exhaust-gas flow corresponds to a given exhaust-gas counter-pressure.

8. The method according to claim 7, which comprises detecting a correct position of the throttling device for throttling the exhaust-gas flow from a comparison of the present charge air pressure with a setpoint charge air pressure at a current exhaust-gas counter-pressure.

9. The method according to claim 1, which comprises, in a rotational speed range of the engine from 0 to 1000 revolutions per minute, setting the throttling device in a closed position in which a cross section of an exhaust system and also a cross section of at least one bypass line are blocked.

10. The method according to claim 1, which comprises closing the at least one bypass line by a pivoting movement of the throttling device for throttling the exhaust-gas flow.

11. The method according to claim 1, which comprises carrying out a closed-loop control of the exhaust-gas counter-pressure and of the charge air pressure, in addition to a closed-loop control of the throttling device, by way of a unit for charge pressure regulation, into which is incorporated a wastegate that bypasses the exhaust-gas turbine.

12. A device for engine braking of an engine, the engine having at least one exhaust-gas turbocharger with an exhaust-gas turbine subjected to an exhaust-gas flow and a charge air compressor, wherein the exhaust-gas turbine and the charge air compressor are mounted on a common shaft, the device comprising:
an exhaust manifold disposed to conduct the exhaust-gas flow from outlet valves of the engine to the at least one exhaust-gas turbocharger;
a throttling device for throttling the exhaust-gas flow disposed between the outlet valves of the engine and the exhaust-gas turbocharger;
at least one bypass line for conducting the exhaust-gas flow past said throttling device for throttling the exhaust-gas flow;
wherein the exhaust-gas flow is conducted through the at least one bypass line to a turbine wheel of the exhaust-gas turbine, the exhaust-gas flow being throttled and a pressure increase in the exhaust gas thus being generated upstream of the throttling device for throttling the exhaust-gas flow;
a measuring system for measuring an exhaust-gas counter-pressure and a charge air pressure; and
a control unit connected to said measuring system and configured for determining, based on a measurement of the exhaust-gas counter-pressure and of the charge air pressure, a position of said throttling device for throttling the exhaust-gas flow to obtain a predetermined braking action, and said control unit being configured to carry out a closed-loop control of the exhaust-gas counter-pressure and of the charge air pressure by way of said throttling device corresponding to the position of said throttling device determined by said control unit, and wherein said control unit is configured:
to perform a determination that a current exhaust-gas counter-pressure lies below a desired exhaust-gas counter-pressure and the charge air pressure corresponds to a desired value, and in response to the determination, to close the position of the throttling device further; and
to perform a further determination that the current exhaust-gas counter-pressure lies below the desired exhaust-gas counter-pressure and the charge air pressure lies below the desired value, and in response to the further determination, to open the position of the throttling device further.

13. The device according to claim 12, wherein said throttling device for throttling the exhaust-gas flow has a first closed position in which a cross section of an exhaust system is blocked but the exhaust-gas flow is conducted through said at least one bypass line past said throttling device, and a second closed position in which the cross section of the exhaust system and said at least one bypass line are blocked.

14. The device according to claim 12, which comprises a unit for charge pressure regulation configured to carry out closed-loop control of the exhaust-gas counter-pressure and of the charge air pressure is carried out in addition to the closed-loop control by the throttling device for throttling the exhaust-gas flow.

15. The device according to claim 14, wherein said unit for charge pressure regulation is formed by at least one wastegate connected to bypass the exhaust-gas turbine.

16. In a method for engine braking of an engine,
the engine having for each cylinder, at least one outlet valve connected to an outlet system, and a throttle device installed in the outlet system, wherein the throttle device, for engine braking, is actuated in such a way that the exhaust-gas flow is throttled and a pressure increase in the exhaust gas is generated upstream of the throttle device, wherein the exhaust gas flows back into a combustion chamber after an intermediate opening of the outlet valve and serves to provide an increased engine braking action during a subsequent compression stroke with the outlet valve still held partially open, wherein during engine braking, an intermediate opening of the outlet valve effected by the pressure increase generated in the exhaust gas when the throttle device is in the throttling position is subjected to a control-based intervention by virtue of the outlet valve, which tends toward closing after the intermediate opening, being forcibly prevented from closing, and then being held partially open at the latest until a cam-controlled outlet valve opening, by the interception of a control unit installed remote from the camshaft in the outlet valve actuating mechanism;
the engine further having at least one exhaust-gas turbocharger with an exhaust-gas turbine acted on by an exhaust-gas flow and a charge air compressor, with the exhaust-gas turbine and the charge air compressor being commonly mounted on a common shaft, having an exhaust manifold which conducts the exhaust-gas flow from outlet valves of the engine to the exhaust-gas turbocharger; and
the throttle device for throttling the exhaust-gas flow being arranged between the outlet valves and the at least one exhaust-gas turbocharger, and at least one bypass line for conducting the exhaust-gas flow past the throttle device for throttling the exhaust-gas flow, wherein the exhaust-gas flow is conducted through the at least one bypass line to a turbine wheel of the exhaust-gas turbine, the exhaust-gas flow is throttled and a pressure increase in the exhaust gas is thus generated upstream of the throttle device for throttling the exhaust-gas flow;

the method which comprises:
measuring an exhaust-gas counter-pressure and a charge air pressure;
based on a measurement of the exhaust-gas counter-pressure and of the charge air pressure, determining a position of the throttle device to obtain a predetermined braking action; and
carrying out a closed-loop control of the exhaust-gas counter-pressure and of the charge air pressure by way of the throttle device for throttling the exhaust-gas flow corresponding to the determined position of the throttle device, and
wherein the closed-loop control includes performing a determination that a current exhaust-gas counter-pressure lies below a desired exhaust-gas counter-pressure and the charge air pressure corresponds to a desired value, and in response to the determination, closing the position of the throttle device further; and
wherein the closed-loop control includes performing a further determination that the current exhaust-gas counter-pressure lies below the desired exhaust-gas counter-pressure and the charge air pressure lies below the desired value, and in response to the further determination, opening the position of the throttle device further.

17. The method according to claim 16, which comprises, at an end of the expansion stroke, when a control of the outlet valve by a camshaft takes effect again, eliminating a holding function of the control unit which previously acted as a hydraulically blocked buffer, and then controlling an opening of the outlet valve up to a full stroke thereof, a holding of the outlet valve and a renewed closing of the outlet valve during an exhaust stroke by way of an associated normal outlet valve control cam via an outlet valve actuating mechanism with the control unit which then acts therein only as a mechanical buffer.

18. The method according to claim 16, wherein the control unit is installed and acts in a rocker arm mounted on a cylinder head and is composed of a control piston, which is movable with low leakage in a bore of the rocker arm axially between two end positions delimited mechanically by stops and which acts at a front on a rear end surface of the outlet valve shank and which is acted on at a rear side by a compression spring and hydraulically, and a control bush which is screwed into a threaded section of the same rocker arm bore and in whose pressure chamber, which is open in the forward direction toward the control piston, is installed the compression spring acting on the control piston and a check valve, which check valve permits only an introduction of pressure medium from a pressure medium supply duct and has a compression-spring-loaded closing member, the pressure medium supply duct being supplied with pressure medium via a feed duct within the rocker arm, wherein a relief duct leads from the pressure chamber through the control bush to an upper end thereof, and the method comprises holding the outlet opening of the relief duct closed during a braking process in an interception and holding phase of the control unit, for building up and holding the pressure medium pressure in the pressure chamber and for an associated deployment and holding of the control piston in a deployed outlet valve interception position, by a stop fixedly mounted on a cylinder cover.

19. The method according to claim 18, which comprises, during a braking process, with an exhaust-gas-counter-pressure-induced intermediate opening of the outlet valve, pushing the control piston out into a deployed end position thereof on account of forces acting in the pressure chamber and following the outlet valve shank, and as a result filling the pressure chamber which becomes larger in volume with pressure medium, and therefore the control piston is subsequently hydraulically blocked in the outlet valve interception position and in said position, by way of an end surface thereof, intercepts and correspondingly holds open the outlet valve which is moving in the closing direction.

20. The method according to claim 19, wherein the return of the control piston from its outlet valve interception position into its retracted basic position at the end of the holding phase takes place in that, upon the actuation of the rocker arm by the camshaft with the normal outlet cam directly or indirectly via a push rod, as a result of the pivoting of said rocker arm away from the cylinder-cover-side stop, the outlet opening of the relief duct within the control bush at the upper end of the control bush is opened up, and therefore the pressure medium situated in the pressure chamber is relieved of pressure and is released from the volume of the control piston which can now move back and is no longer blocked by the rocker arm, the release taking place until the control piston has assumed its fully retracted basic position.

21. The method according to claim 16, wherein the engine is an internal combustion engine with an underlying camshaft from which the actuation of an outlet valve takes place via a push rod and a following rocker arm, wherein the control unit acts in the chamber between the push rod and force introduction member of the rocker arm in a holding sleeve arranged in or on the cylinder head, and the control unit has a control sleeve coaxially movable with low leakage in the holding sleeve and supported on the upper end of the push rod and has a control piston installed so as to be coaxially movable with low leakage in a blind bore of the control sleeve, which control piston is supported at the top on a thrust transmission part articulatedly connected to the force introduction member of the rocker arm and is acted on at the bottom by a compression spring which acts in the direction of said thrust transmission part, which compression spring is installed in that part of the blind bore provided below the control piston and the hydraulic pressure chamber thus delimited, which pressure chamber is supplied with pressure medium, in particular engine oil, via a feed duct within the cylinder head or block and via a feed duct within the holding sleeve and via a supply duct, which communicates with said feed duct within the holding sleeve, within the control sleeve, wherein a check valve installed in the pressure chamber prevents, by means of its spring-loaded closing member, a return flow of pressure medium from the pressure chamber into the supply duct.

22. The method according to claim 21, wherein, during a braking process, with the exhaust-gas-counter-pressure-induced intermediate opening of the outlet valve, deploying the control piston on account of the forces acting in the pressure chamber, and here, the rocker arm is made to perform a follow-up movement, wherein during the deployment of the control piston, after a stroke travel coordinated with the spring-open stroke of the outlet valve, the outlet opening of a relief duct within the control piston is opened up by emerging from the blind bore in the control sleeve, and the pressure medium within the pressure chamber is relieved of pressure via said relief duct, and in that, at the start of the subsequent closing movement of the outlet valve, the control piston is moved in the direction of its non-deployed basic position again by means of the rocker arm which has performed a corresponding follow-up movement and the thrust transmission part until the outlet opening of the relief duct is closed again by the wall of the blind bore, as a result of which the pressure chamber is shut off again, the control unit is therefore hydraulically blocked, and the outlet valve remains held intercepted in the corresponding partially open position.

23. The method according to claim 21, wherein the elimination of the hydraulic blocking of the control piston in the control sleeve and the return of the control piston out of the outlet valve interception position into its non-deployed basic position take place when, during actuation of the push rod by the camshaft with the normal outlet cam, and the associated stroke of the control sleeve, after a certain stroke, coordinated with the maximum opening stroke of the outlet valve, of the control sleeve, as a result of the emergence thereof from the holding bore of the holding sleeve, the outlet cross section of a relief bore extending transversely from the pressure chamber is opened up, the pressure medium situated in the pressure chamber is relieved of pressure and is released from the volume of the control piston which can now move back, said release taking place until said control piston has assumed its fully retracted basic position, attained when the thrust transmission part sets down on the end side of the control sleeve.

24. The method according to claim 16, which comprises holding the outlet valve, after the exhaust-gas-counter-pressure-induced intermediate opening, in an interception position, wherein a distance from the closed position amounts to approximately $\frac{1}{5}$ to $\frac{1}{20}$ of a full camshaft-controlled outlet valve opening stroke.

25. The method according to claim 16, which comprises also taking into consideration the control unit as a hydraulic valve play compensating element, and compensating for a degree of play occurring in the valve actuating mechanism by way of corresponding pressure medium replenishment into the pressure chamber with corresponding follow-up movement of the control piston in a direction of a member to be acted on.

* * * * *